United States Patent [19]
DiPietro

[11] 3,975,997
[45] Aug. 24, 1976

[54] DEEP FAT FRYER

[76] Inventor: Carmelo V. DiPietro, 3835 Lincoln Drive, Birmingham, Mich. 48010

[22] Filed: Sept. 17, 1975

[21] Appl. No.: 614,121

[52] U.S. Cl. .................................. 99/407; 99/410; 99/417; 220/19
[51] Int. Cl.² ......................................... A47J 37/12
[58] Field of Search ..................... 99/407, 335–336, 99/355, 359, 389, 403, 408, 410–411, 412–413, 414–415, 416–417, 418, 450; 220/17, 19

[56] References Cited
UNITED STATES PATENTS

| | | | |
|---|---|---|---|
| 948,198 | 2/1910 | Wiegand | 99/417 |
| 1,343,738 | 6/1920 | Nelson | 99/416 |
| 2,186,855 | 1/1940 | Baccarini | 99/417 |
| 2,382,380 | 8/1945 | Buttner | 99/450 X |
| 2,556,115 | 6/1951 | Smith | 99/417 |
| 2,807,454 | 9/1957 | Beadle | 220/19 X |
| 3,107,602 | 10/1963 | Ingram, Jr. et al. | 99/407 |
| 3,364,845 | 1/1968 | Wilson et al. | 99/408 X |
| 3,430,553 | 3/1969 | DiPietro | 99/407 X |
| 3,690,246 | 9/1972 | Guthrie, Sr. | 99/336 |

*Primary Examiner*—Stanley N. Gilreath
*Assistant Examiner*—Arthur O. Henderson

[57] ABSTRACT

The invention is an improvement on the deep fat fryer disclosed in my U.S. Pat. No. 3,430,553, which shows a food basket movable between a cooking position in which the food is immersed in shortening and a tilted drain position, and an impervious tray moving with the basket for collecting particles so that when the basket and tray are tilted, the shortening and particles will be drained therefrom into a filter basket. The improvement comprises a perforated wall attached to the tray and extending thereabove so that when the tray and basket are lifted above the shortening, the particles will be prevented from going sideways over the edges of the tray into the pot or frying vessel.

6 Claims, 4 Drawing Figures

U.S. Patent  Aug. 24, 1976  3,975,997
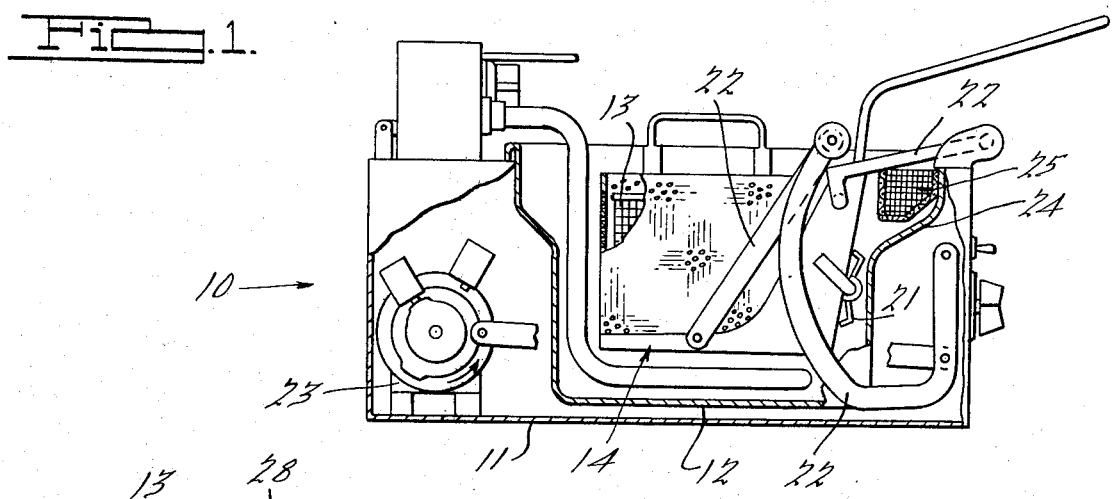
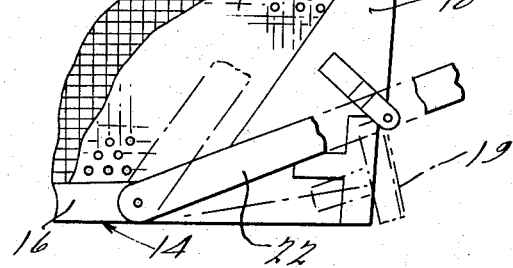
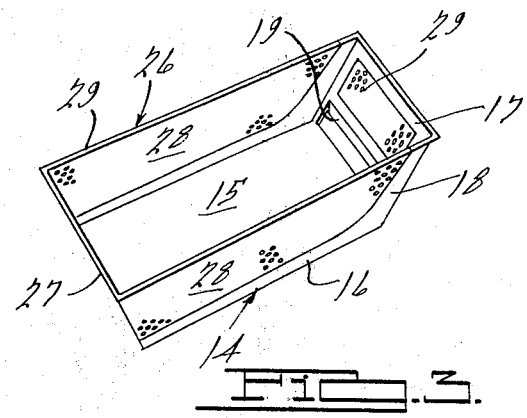
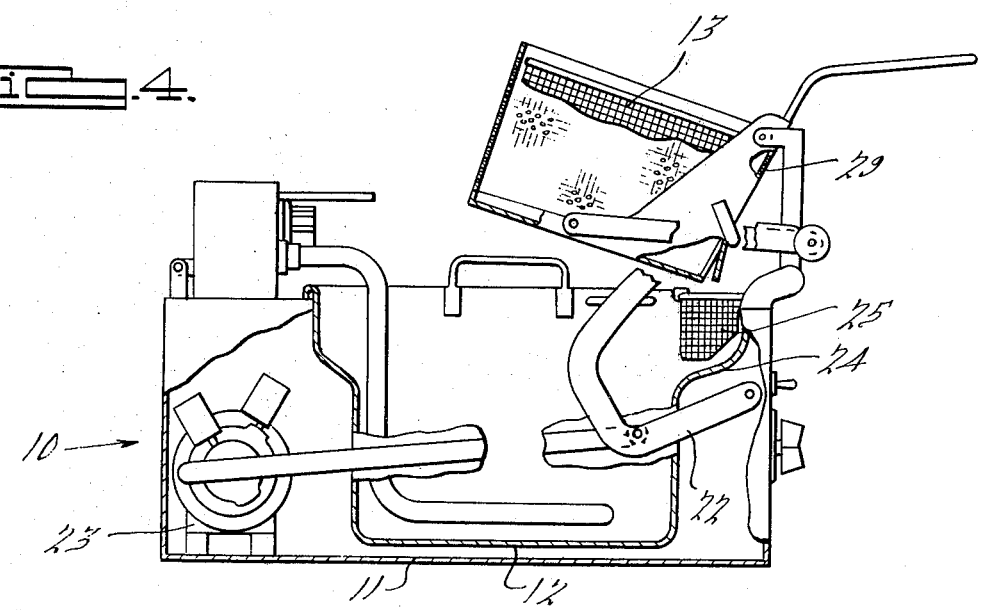

DEEP FAT FRYER

BACKGROUND OF THE INVENTION

1. Field of the Invention

The invention relates to deep fat fryers, and more particularly to fryers of the type shown in my prior U.S. Pat. No. 3,430,553 in which an impervious tray secured to a food basket is tilted with the basket and is intended to prevent food particles from entering the frying vessel or pot so that the particles may be caught in a filter basket to which they are drained.

2. Description of the Prior Art

The impervious tray shown by the aforementioned patent has been found to have a drawback in the lifting of the basket and tray creates a suction of pressure differential in the body of oil which causes a great deal of crumbs, food particles and debris to flow outwardly over the side edges of the tray and therefore into the pot.

BRIEF SUMMARY OF THE INVENTION

It is an object of the present invention to overcome this shortcoming of my prior deep fat fryer construction and to provide a novel and improved metal container for the tiltable basket which prevents appreciable loss of entrapped food particles into the pot while still maintaining substantially full circulation of oil and not interfering with the control of oil temperature throughout the pot.

It is another object to provide an improved fryer construction of this character which is simple, economical and reliable in use, is easily incorporated in the aforesaid prior known deep fat fryer construction, and eliminates the need for auxiliary crumb collecting means in the frying vessel.

Briefly, the illustrated embodiment of the invention comprises, in combination with a deep frying vessel, an open mesh food basket movable between a cooking position in which the food within the basket is immersed in shortening held by the vessel and a drain position above the vessel, and an impervious particle collecting tray below said basket and movable in unison therewith, the improvement comprising a perforated wall secured to and extending above said tray and surrounding said basket, the perforations in said wall being sufficient in number and size to permit circulation of oil between the basket and vessel but sufficiently small to prevent substantial exit of food particles from the basket when it is being lifted from its cooking to its drain position.

BRIEF DESCRIPTION OF THE DRAWINGS

FIG. 1 is a side elevational view of a deep fat fryer embodying the invention, parts being sectioned and broken away showing the food basket in its cooking position;

FIG. 2 is an enlarged fragmentary elevational view showing a portion of the perforated container wall;

FIG. 3 is a perspective view showing the construction of the particle-entrapping container; and FIG. 4 is a partial side elevational view showing the basket and container in their drain position.

DESCRIPTION OF THE PREFERRED EMBODIMENT

The deep fat fryer is generally indicated at 10 and has a rectangular housing 11 within which is mounted a removable cooking vessel 12 for containing the cooking oil and an open mesh food basket 13. The food basket is tiltable between a cooking position as shown in FIG. 1 in which the food within the basket is immersed in shortening held by vessel 12, and a tilted drain position as shown in FIG. 4. The basket is supported by a particle collecting tray generally indicated at 14. This tray, which is impervious, has a flat bottom 15 underlying and spaced from the bottom of basket 13, and sides 16 which extend upwardly a short distance around the basket. In addition, the rear wall 17 of tray 14 extends upwardly along the entire height thereof and has a pair of inclined sides 18. The lower portion of wall 17 is provided with a trap door 19 which extends the entire width of the wall. This trap door is urged toward its closed position by spring means 21.

Tray 14 is supported for rocking movement between the cooking position of FIG. 1 and the drain position of FIG. 4 by means of links partially indicated at 22 which connect opposite sides of the tray with housing 11. A gear motor 23 is mounted within housing 11 and is connected to links 22. The arrangement is such that when the parts are in their FIG. 1 position the basket will be partially immersed in the shortening. Upon operation of the gear motor the basket will rock upwardly and to the right to the FIG. 4 position. As this happens trap door 19 will be swung open in a counterclockwise direction with respect to the main portion of wall 17 by engagement of a portion thereof with one of links 22 (FIG. 4). Vessel 12 has a widened upper portion 24, and a filter basket 25 is mounted in this upper portion, in which a paper or other disposable filter medium may be placed so as to retain crumbs and other particles but permit shortening to drain from the basket into vessel 12. When trap door 19 opens it is directly above the filter basket so that the shortening and crumbs lifted from the vessel by tray 14 will drain into the filter basket, tray 14 being inclined downwardly and rearwardly when in its drain position. Continued operation of gear motor 23 will cause the parts to return to their cooking position of FIG. 1 and permit springs 21 to close the trap door.

It is realized that some portions of the mechanism for carrying out the above-described functions have not been described in detail, since a full description is found in the aforementioned patent. However, the portions of the fryer essential for a full understanding of the present invention have been described.

According to the present invention, means are provided for preventing substantial exit of food particles from basket 13 when it is being lifted from its cooking to its drain position. This means comprises a perforated wall generally indicated at 26 which is attached to tray 14 and extends thereabove. This wall is shown as having a front portion 27 extending upwardly from the front of the tray, and side portions 28 extending upwardly from the side tray portions 16. A stiffening member 29 may be provided along the top edge of wall 26, and the edges of the wall which are adjacent tray 14 are secured thereto by such means as welding. The perforations are sufficient in number and size to permit circulation of oil between the basket and vessel when the basket is in its cooking position, but are sufficiently small to prevent substantial exit of food particles from the basket to the vessel when the basket is being lifted from its cooking to its drain position. Suitably, the diameters of the perforations could be 0.035 inch and the open area of the perforated wall no less than 30% of the total wall area, which will prevent debris and crumbs from entering the cooking oil but allow sludge to run out. The shape of the container is approximately the same as that of the adjacent portions of the basket.

In addition, a central portion of wall 17 is replaced by a perforated section 29 to permit additional oil circulation between the basket and cooking vessel.

In operation, when the basket and tray are lifted, wall 26 will prevent a suction or pressure differential in the body of oil from causing crumbs, food particles or debris to flow outwardly over the side edges of the tray and into vessel 12. Thus, the need for auxiliary crumb collecting means in the bottom of vessel 12, such as is shown in the aforementioned patent, is eliminated, and the oil in the frying vessel will remain useable for a longer period of time.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. In combination with a deep frying vessel, an open mesh food basket movable between a cooking position in which the food within the basket is immersed in shortening held by the vessel and a drain above the vessel, and an impervious particle collecting tray below said basket and movable in unison therewith, the improvement comprising a perforated wall secured to and extending above said tray and surrounding said basket, the perforations in said wall being sufficient in number and size to permit circulation of oil between the basket and vessel but sufficiently small to prevent substantial exit of food particles from the basket when it is being lifted from its cooking to its drain position.

2. A deep fat fryer according to claim 1, said tray being rectangular, said perforated wall being disposed on all four sides of said tray.

3. A deep fat fryer according to claim 2, further provided with means on the tray for permitting drainage thereof comprising a trap door on the end thereof which is lower when the tray is tilted, a portion of said perforated wall being above said trap door.

4. A deep fat fryer according to claim 1, the open area of said perforated wall being no less than 30% of the total wall area.

5. A deep fat fryer according to claim 4, the size of the perforation in said wall being 0.035 inch.

6. A deep fat fryer according to claim 1, the top of said perforated wall being approximately at the level of the top of said basket.

* * * * *

UNITED STATES PATENT AND TRADEMARK OFFICE
CERTIFICATE OF CORRECTION

PATENT NO. : 3,975,997
DATED : Aug. 24, 1976
INVENTOR(S) : Carmelo V. DiPietro

It is certified that error appears in the above-identified patent and that said Letters Patent are hereby corrected as shown below:

Column 3, line 27, after "drain", the word --position-- should be added.

Column 4, line 22, after "the", the word --maximum-- should be added.

Signed and Sealed this

Twenty-fifth Day of January 1977

[SEAL]

Attest:

RUTH C. MASON
Attesting Officer

C. MARSHALL DANN
Commissioner of Patents and Trademarks